United States Patent [19]
Baum et al.

[11] 3,757,639
[45] Sept. 11, 1973

[54] NEGATIVE HYDRAULIC RATE DEVICE

[75] Inventors: James A. Baum, Enfield, Conn.;
Charles F. Stearns, East Longmeadow, Mass.

[73] Assignee: United Aircraft Corporation, East Hartford, Conn.

[22] Filed: Jan. 12, 1972

[21] Appl. No.: 217,129

Related U.S. Application Data

[63] Continuation of Ser. No. 52,162, July 6, 1970, abandoned.

[52] U.S. Cl............................ 91/47, 91/307, 91/359, 137/82
[51] Int. Cl.............................................. F15b 9/02
[58] Field of Search ................... 137/82, 85, 86, 84; 91/47, 307, 359

[56] References Cited
UNITED STATES PATENTS

| | | | |
|---|---|---|---|
| 2,764,868 | 10/1956 | Watson | 91/47 X |
| 2,958,503 | 11/1960 | Vaughn | 91/47 X |
| 3,083,722 | 4/1963 | Dalder | 137/82 |
| 3,403,598 | 10/1968 | Franz | 91/47 |

Primary Examiner—Alan Cohan
Attorney—Norman Friedland

[57] ABSTRACT

A force change from an input load on a force balance lever of a hydraulic servo system is augmented by an additional force indicative of a change in servo pressure by porting servo pressure from the servo piston to a bellows acting on the force balance lever for imparting a negative rate thereto.

2 Claims, 2 Drawing Figures

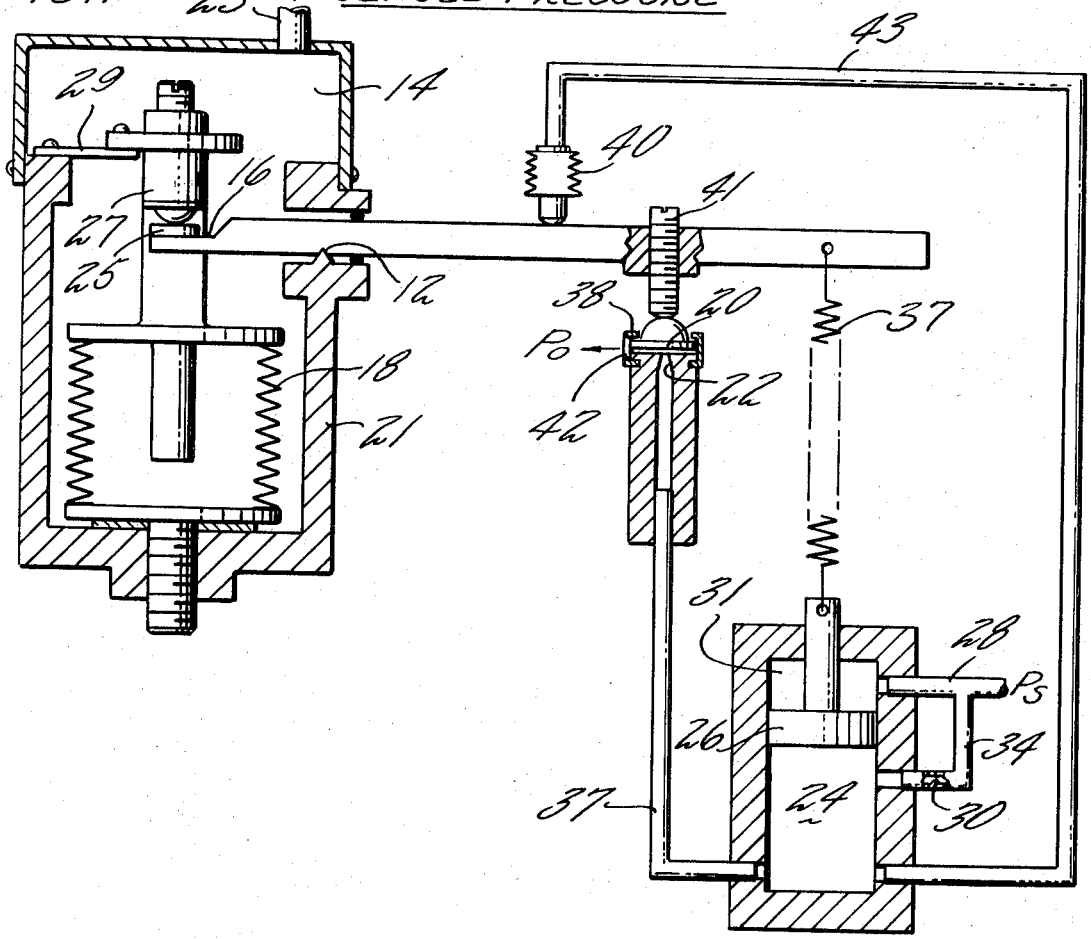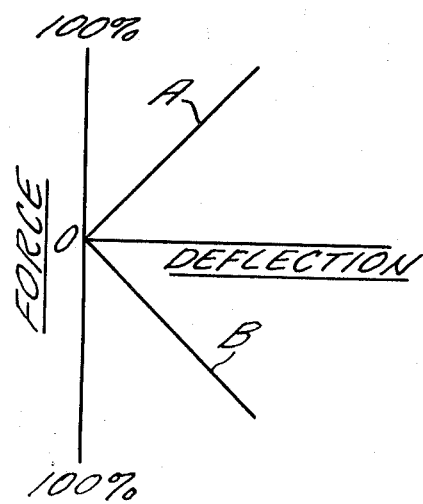

NEGATIVE HYDRAULIC RATE DEVICE

This is a X continuation, of application Ser. No. 52,162, filed July 6, 1970 now abandoned.

BACKGROUND OF THE INVENTION

As it is well known in the art, force balance systems utilizing a flapper valve which cooperates with a force balance lever serves to change the servo pressure admitted to a hydraulic piston for producing an output indicative of the input signal. A force feedback spring connected to the servo piston restores the force balance lever to the null position so that the lever requires minute changes in displacement for changing the output resulting in large output forces for small input force signals. A system exemplary of this type of servo system is described in U.S. Pat. No. 2,926,494 granted to T. P. Farkas and entitled "Fuel Control System" on Mar. 1, 1960. The servo piston described in that patent is used to control the position of the throttle valve but obviously the particular use to which this invention can be employed is not limited thereto but rather as would be obvious to one skilled in the art it can be employed in conjunction with any force balance servo system.

It is also well known in the art that jet nozzles are customarily sized such that dampening is achieved in order to obtain stability in the system. It is, however, novel to provide in a flapper type of force balance system the dampening together with means for obtaining a negative hydraulic rate force. Thus, we have found that we can provide in a novel manner means for obtaining negative rate to assist the flapper when overcoming servo friction, improve system accuracy and reduce the component sizes of the system while not deviating from system accuracy.

SUMMARY OF THE INVENTION

This invention relates to an improved hydraulic servo system in which a balance flapper level is utilized.

An object of this invention is to augment the input signal by a force indicative of a function of the change in servo pressure applied to the servo piston.

A still further object of this invention is to transmit servo pressure from the servo piston chamber to a bellows imparting a force to the force balance lever of a hydraulic servo system to obtain a hydraulic negative rate.

Other features and advantages will be apparent from the specification and claims and from the accompanying drawings which illustrate an embodiment of the invention.

BRIEF DESCRIPTION OF THE DRAWINGS

FIG. 1 is a view partly in elevation and partly in section illustrating the details of the invention, and FIG. 2 is a graphical illustration showing the spring rates of the springs acting on the flapper arm.

DESCRIPTION OF THE PREFERRED EMBODIMENT

Reference is hereby made to FIG. 1 which shows a typical servo system utilizing a flapper valve for controlling the position of a servo piston and the improvement made thereto. As can be viewed from the drawing, the servo system comprises a force balance lever 10 pivotally supported at 12 in housing 14 having one end 16 connected to the free end of the bellows 18 which senses an input signal for imparting a force thereto. Bellows 18 may be evacuated and displaces as a function of the pressure in housing 14, which is in communication with a pressure signal intended to be measured, admitted thereto through inlet 23. This force is transmitted to the end portion 25 of lever 10 via the adjustable connecting rod 27 and serves to position flapper 20 which is mounted adjacent the flapper nozzle 22 for defining therewith a curtain area regulating the outflow and hence the pressure in the servo chamber 24 acting against the servo piston 26. Flexure 29 suitably supported to housing 14 spring loads bellows 18. Servo supply pressure from line 28 is admitted into chamber 31 as well as chamber 24 via restriction 30 disposed in branch line 34. Line 36 conducts servo pressure to nozzle 22 where it impinges on the flapper 20 supported in flapper support 38 in such a manner as to allow axial movement, forcing it to bear against adjusting screw 41 threadably secured to lever 10. The curtain area defined by flapper 20 and the end of nozzle 22 determines the rates of flow through the nozzle to drain via opening 42 in flapper support 38 for regulating the pressure drop across 30. Piston 26 is a half area servo where the fluid in chamber 24 must equal one-half servo pressure minus drain pressure to establish equilibrium. Thus, the pressure established by the flapper controls the pressure in chamber 24 acting on piston 26 for translating it rectilinearly.

Feedback spring 37 (in tension) attached to one end of fulcrum lever 10 and piston 26 serves to impart a counteracting force to balance the input force developed by bellows 18. When these forces are in balance, flapper 20 is at a given null position relative to the nozzle 22 for holding the sevo piston 26 in the desired position which is indicative of the input signal developed by bellows 18.

In accordance with this invention, a negative hydraulic rate device is utilized to reduce the total system rate while overcoming servo friction by imposing a load to the force balance lever 10. The negative hydraulic rate is developed by bellows 40 which is connected by line 43 to the servo pressure chamber 24. Bellows 40 is sized and oriented to give a force which is greater than the force created by the impact of the fluid egressing from nozzle 22 against flapper 20. This force can be visualized by imagining that the piston is opposed by large friction forces which will require the flapper 20 to change the pressure in chamber 24 in order to move the piston 26. This device is so designed to feed the pressure in chamber 24 to bellows 40 where it is in such a direction to help move the flapper to change pressure to overcome friction. Thus the total positive mechanical rate developed through the servo system is counteracted by the negative rate developed by the bellows 40.

Looking at FIG. 2, it can be seen that the rate of the servo system is defined by curve A and the rate selected by sizing and locating bellows 40 is defined by curve B, each being of substantially the same magnitude but different direction. From the foregoing it is apparent that the orientation and size of the bellows is such that it assists motion of the balance lever in a manner to overcome the servo friction. Not only does this increase the accuracy of a given system but can allow the reduction in size of servo area, bellows area and/or force balance lever ratios while maintaining the same system accuracy that is obtainable in the heretofore known devices. In addition, such a system allows the use of a dampening type of flapper nozzle which heretofore could not be utilized with a negative rate producing member.

It should be understood that the invention is not limited to the particular embodiments shown and described herein, but that various changes and modifications may be made without departing from the spirit or scope of this novel concept as defined by the following claims.

We claim:

1. A force balance servo system having a fulcrumed lever, a servo piston mounted in a cylinder which is supplied with servo fluid, a flapper valve juxtaposed to and driven by said fulcrumed lever and mounted adjacent a nozzle formed on one end of a flow line connected to said cylinder for regulating the servo pressure acting on said piston, said flow line being sized to dampen the fluid flowing therein, a force producing member imparting a load to said fulcrumed lever for adjusting the curtain area established between said flapper and nozzle for changing the pressure acting on said piston, means including a fixed restriction for admitting servo fluid into said cylinder to act on said piston such that the curtain area adjusts the the pressure drop across the restriction, feedback means including a spring interconnecting said piston and said fulcrumed lever for balancing the forces on said lever and reposition said flapper to the null position, a negative hydraulic rate producing means including a load imparting member bearing against said fulcrumed lever, connecting means interconnecting said cylinder and said load imparting member for leading said servo fluid acting on said piston to load said load imparting member, said load imparting member so located with respect to said fulcrum and so sized to impart a net negative rate to the fulcrumed lever upon a change in said curtain area so as to reduce the total rate of the servo system and overcome servo friction.

2. A force balance servo system as claimed in claim 1 wherein said negative hydraulic rate producing means includes a bellows supported adjacent said fulcrumed lever and having a free end bearing against a surface of said force balancing lever and said flapper is on one side of said force balance lever and said bellows is on the other side.

* * * * *